(12) United States Patent
Wind et al.

(10) Patent No.: US 11,754,430 B2
(45) Date of Patent: Sep. 12, 2023

(54) OPERATING FLUID CONTAINER WITH CAPACITIVE DETECTION OF FILLING LEVELS

(71) Applicant: KAUTEX TEXTRON GmbH & Co. KG, Bonn (DE)

(72) Inventors: Stefan Wind, Hennef (DE); Axel Barkow, Hurth (DE)

(73) Assignee: KAUTEX TEXTRON GmbH & Co. KG, Bonn (DE)

( * ) Notice: Subject to any disclaimer, the term of this patent is extended or adjusted under 35 U.S.C. 154(b) by 0 days.

(21) Appl. No.: 16/979,384

(22) PCT Filed: Feb. 15, 2019

(86) PCT No.: PCT/EP2019/053794
§ 371 (c)(1),
(2) Date: Sep. 9, 2020

(87) PCT Pub. No.: WO2019/170392
PCT Pub. Date: Sep. 12, 2019

(65) Prior Publication Data
US 2021/0003439 A1    Jan. 7, 2021

(30) Foreign Application Priority Data
Mar. 9, 2018 (DE) .................... DE102018203633.0

(51) Int. Cl.
*G01F 23/263*   (2022.01)
*D06F 39/08*    (2006.01)

(52) U.S. Cl.
CPC .......... *G01F 23/263* (2013.01); *D06F 39/087* (2013.01)

(58) Field of Classification Search
CPC .... G01F 23/263; G01F 23/242; G01F 23/241; G01F 23/243; G01F 23/266
(Continued)

(56) References Cited

U.S. PATENT DOCUMENTS 2,841,163 A * 7/1958 Williamson .......... G01F 23/266
                                                    137/98
2,849,882 A * 9/1958 Lee ....................... G01F 23/263
                                                    73/304 C
(Continued)

FOREIGN PATENT DOCUMENTS

| DE | 4404938 | 8/1994 |
|---|---|---|
| DE | 10242955 | 3/2004 |

(Continued)

OTHER PUBLICATIONS

ESPACENET Machine Translation of DE 102010011638 A1 Which Originally Published on Sep. 22, 2011. (Year: 2011).*
(Continued)

*Primary Examiner* — David A. Rogers
(74) *Attorney, Agent, or Firm* — Lee & Hayes, P.C.

(57) ABSTRACT

An operating fluid tank includes a capacitor. The capacitor includes a first electrode and a second electrode. Between the first electrode and the second electrode, a clearance is formed which is fluid-connected to an operating fluid tank interior. The fluid tank also includes an evaluator electrically connected to the capacitor for determining a capacity of the capacitor by means of measurement signals determined by the capacitor. The first electrode and the second electrode include an electrically conductive plastic material.

14 Claims, 4 Drawing Sheets

Figure 1:
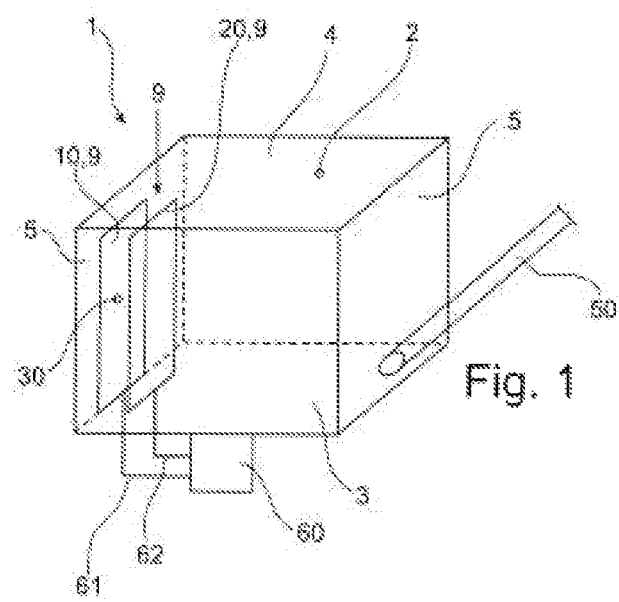

(58) Field of Classification Search
USPC .............................. 73/290 R, 304 R, 304 C
See application file for complete search history.

(56) References Cited

U.S. PATENT DOCUMENTS

| | | | | | |
|---|---|---|---|---|---|
| 3,840,406 | A | * | 10/1974 | Depoix | H01M 12/06 |
| | | | | | 429/406 |
| 4,003,259 | A | * | 1/1977 | Hope | G01F 23/263 |
| | | | | | 73/304 C |
| 4,122,718 | A | * | 10/1978 | Gustafson | G01F 23/263 |
| | | | | | 73/304 C |
| 4,417,473 | A | * | 11/1983 | Tward | G01F 23/263 |
| | | | | | 73/304 C |
| 4,448,071 | A | * | 5/1984 | Tward | G01F 23/263 |
| | | | | | 73/304 C |
| 4,511,948 | A | * | 4/1985 | Maltby | G01F 23/263 |
| | | | | | 73/304 C |
| 4,594,893 | A | * | 6/1986 | Lombard | G01F 23/263 |
| | | | | | 324/669 |
| 4,780,663 | A | * | 10/1988 | Mulder | G01F 23/263 |
| | | | | | 73/304 R |
| 4,988,418 | A | * | 1/1991 | Beck | G01N 27/416 |
| | | | | | 205/780 |
| 5,033,300 | A | * | 7/1991 | Matsuo | G01F 23/242 |
| | | | | | 73/304 R |
| 5,051,921 | A | * | 9/1991 | Paglione | G01F 23/268 |
| | | | | | 73/304 C |
| 5,304,347 | A | * | 4/1994 | Mann | G01F 23/263 |
| | | | | | 422/50 |
| 5,546,005 | A | | 8/1996 | Rauchwerger | |
| 6,148,666 | A | * | 11/2000 | Roesicke | G01F 23/266 |
| | | | | | 340/620 |
| 6,451,470 | B1 | * | 9/2002 | Koschany | H01M 8/1004 |
| | | | | | 429/414 |
| 7,107,838 | B2 | * | 9/2006 | Chai | C02F 1/003 |
| | | | | | 73/290 R |
| 7,232,077 | B2 | * | 6/2007 | Turnbull | G01F 23/24 |
| | | | | | 73/304 C |
| 7,905,144 | B2 | * | 3/2011 | Thobe | G01F 13/00 |
| | | | | | 73/304 R |
| 8,551,305 | B2 | * | 10/2013 | Behr | C02F 1/4672 |
| | | | | | 204/267 |
| 9,182,267 | B2 | * | 11/2015 | Yamaguchi | G01F 23/268 |
| 9,658,095 | B2 | * | 5/2017 | Winkens | G01F 23/268 |
| 9,983,042 | B2 | * | 5/2018 | Huang | G01F 23/266 |
| 10,151,616 | B1 | * | 12/2018 | Otagaki | B65D 25/02 |
| 2003/0051799 | A1 | | 3/2003 | Stevenson et al. | |
| 2006/0103393 | A1 | | 5/2006 | Stahlmann et al. | |
| 2007/0006646 | A1 | * | 1/2007 | Vargas Da Silva | G01F 23/24 |
| | | | | | 73/304 R |
| 2011/0102000 | A1 | | 5/2011 | Klett et al. | |
| 2011/0120219 | A1 | * | 5/2011 | Barlesi | G01F 23/266 |
| | | | | | 73/304 C |
| 2011/0185808 | A1 | * | 8/2011 | Arndt | G01F 23/266 |
| | | | | | 73/304 C |
| 2011/0240475 | A1 | * | 10/2011 | Hother | G01F 23/242 |
| | | | | | 204/674 |
| 2014/0110004 | A1 | * | 4/2014 | Westmeier | H05B 3/58 |
| | | | | | 138/33 |
| 2015/0040659 | A1 | * | 2/2015 | Yu | G01R 1/0416 |
| | | | | | 73/290 R |
| 2016/0164112 | A1 | * | 6/2016 | Seipp | H01M 8/0297 |
| | | | | | 429/508 |
| 2017/0009930 | A1 | * | 1/2017 | Larink | B08B 9/055 |
| 2019/0240653 | A1 | * | 8/2019 | Ott | B25J 9/1664 |
| 2021/0043436 | A1 | * | 2/2021 | Kaposi | H01J 49/063 |

FOREIGN PATENT DOCUMENTS

| | | | | |
|---|---|---|---|---|
| DE | 102006005529 | | 8/2007 | |
| DE | 102006005529 | A1 * | 8/2007 | ............... B60S 1/50 |
| DE | 102008001100 | | 10/2009 | |
| DE | 102009000611 | | 8/2010 | |
| DE | 102009049783 | | 4/2011 | |
| DE | 102010011638 | | 9/2011 | |
| DE | 102015200691 | | 7/2016 | |
| DE | 102015200691 | A1 * | 7/2016 | |
| DE | 102015203744 | | 9/2016 | |
| EP | 0378304 | | 7/1990 | |
| JP | S48-052558 | | 7/1973 | |
| JP | S5483466 | | 7/1979 | |
| JP | S58-020892 | | 5/1983 | |
| JP | S59214716 | | 12/1984 | |
| JP | S6111616 | | 1/1986 | |
| JP | H02264829 | | 10/1990 | |
| JP | H05223623 | | 8/1993 | |
| JP | H09061223 | | 3/1997 | |
| JP | H11223545 | | 8/1999 | |
| JP | 2002340653 | | 11/2002 | |
| JP | 2003057097 | | 2/2003 | |
| JP | 2006220542 | | 8/2006 | |
| JP | 2009540296 | | 11/2009 | |
| JP | 2011516869 | | 5/2011 | |
| JP | 2012163508 | | 8/2012 | |
| JP | 2013117513 | | 6/2013 | |
| JP | 2013205370 | | 10/2013 | |
| JP | 2015133782 | | 7/2015 | |
| JP | 2016075548 | | 5/2016 | |
| JP | 2017511480 | | 4/2017 | |
| JP | 2021516341 | | 7/2021 | |
| WO | WO2008066575 | | 6/2008 | |
| WO | WO-2019129500 | A1 * | 7/2019 | ........... G01N 27/026 |

OTHER PUBLICATIONS

ESPACENET Machine Translation of DE 102006005529 A1 Which Originally Published on Aug. 16, 2007. (Year: 2007).*
ESPACENET Machine Translation of DE 102015200691 A1 Which Originally Published on Jul. 21, 2016. (Year: 2016).*
JP Office Action for corresponding JP Patent Application No. 2020-547079 dated Jul. 8, 2021, 6 pages.
PCT International Preliminary Report on Patentability for PCT Application No. PCT/EP2019/053794 dated May 26, 2020, 27 pages.
PCT Search Report for PCT Application No. PCT/EP2019/053794 dated Mar. 31, 2019, 16 pages.
Chinese Office Action from corresponding Chinese Patent Application No. 201980017961.4 dated Jan. 26, 2022, 8 pages.
Japanese Office Action for corresponding Japanese Patent Application No. JP 2020-547079, dated Apr. 3, 2023, 20 pages.

* cited by examiner

OPERATING FLUID CONTAINER WITH CAPACITIVE DETECTION OF FILLING LEVELS

This application claims priority to PCT Application No. PCT/EP2019/053794, filed Feb. 15, 2019, which claims priority to German Patent Application No. 10 2018 203 633.0, filed Mar. 9, 2018, the contents of each of which is incorporated herein by reference.

The invention relates to an operating fluid tank with a capacitive measuring device for determining a filling level of the operating fluid tank.

The following also refers to operating fluid tanks designed as fuel tanks (for gasoline or diesel fuels) which are designed for use in a motor vehicle. Operating fluid tanks within the meaning of the invention are in particular but not exclusively fuel tanks for motor vehicles, urea tanks for the storage of urea to be injected into an exhaust gas system, water tanks for the storage of water to be injected into combustion chambers of a combustion engine, washer water tanks, oil tanks, auxiliary liquid tanks or additive tanks for motor vehicles. Tanks of the type mentioned above are often produced by extrusion blow molding, wherein in particular HDPE (high-density polyethylene) is suitable for the production of extrusion blow molded tanks. Furthermore, appropriate operating fluid tanks can be manufactured by means of an injection molding process.

Operating fluid tanks, whose fill levels are determined by means of lever indicators, each having a float suspended on the operating fluid, are known from prior art. Such lever indicators require a relatively large amount of space within the operating fluid tank. Furthermore, such lever indicators are prone to interference, in particular when used in operating fluid tanks, which are designed for receiving an aqueous solution. For example, aqueous urea solution, which is injected into the exhaust gas system for removing $NO_x$ from exhaust gases, freezes at a temperature below −11° C., so that in driving mode ice chunks can collide with the lever indicator and its components and damage them.

Capacitive level sensors for solving this problem are known from prior art. By means of a capacitive level sensor, capacitors can be used contactlessly to determine the fill level of an operating fluid tank. DE 10 2010 011 638 A1 describes a capacitive level sensor, which has a first and a second elongated level electrode, each arranged parallel to the other on the exterior of a liquid tank in a first direction, in which a fill level of the liquid tank changes. The level sensor also has a first and a second elongated reference electrode, which are arranged in a second direction parallel to each other on the exterior of the liquid tank whereby the second direction runs along a base of the liquid tank. The capacitive level sensor described in DE 10 2010 011 638 A1 also has an evaluation unit, which is connected to the two level electrodes and to two reference electrodes, and which is formed for determining a level of a liquid within the liquid tank by means of signals from the level electrodes.

The invention is based on the object of providing an operating fluid tank with a level detection system which improves the accuracy of determining the level of the operating fluid tank and which is easier to manufacture.

The problem addressed by the invention is solved by an operating fluid tank with the features of claim 1. Advantageous embodiments of the operating fluid tank are described in the claims dependent on claim 1.

More precisely, the problem addressed by the invention is solved by an operating fluid tank with a capacitor with a first electrode and a second electrode, wherein a clearance is formed between the first electrode and the second electrode which is fluid-connected to an operating fluid tank interior. The operating fluid tank further has an evaluator electrically connected to the capacitor, which is designed for determining a capacity of the capacitor by means of the measurement signals determined by the capacitor. The operating fluid tank according to the invention is characterized in that the first electrode and the second electrode have an electrically conductive plastic material.

The di-electric constant between the electrodes of the capacitor can be determined by determining the capacity of the capacitor based on the well-known geometry of the capacitor.

Thus, with known operating fluid or known di-electric constant of the filled operating fluid, the fill level of the operating fluid tank interior can be determined. In this case, the evaluator is designed to determine a fill level of the operating fluid tank interior.

In addition, a known operating fluid or a known di-electric constant can be used to determine the physical state of the filled operating fluid. In this case, the evaluator is designed to determine a physical state of the operating fluid in the operating fluid tank interior.

Furthermore, a quality property of the operating fluid can be inferred from the known fill level of the operating fluid tank, since the di-electric constant depends on the composition of the operating fluid. In this case, the evaluator is designed to determine a quality property of the operating fluid in the operating fluid tank interior.

The operating fluid tank according to the invention increases the accuracy of determining the capacity of the capacitor. In particular, the operating fluid tank according to the invention increases the accuracy of determining the fill level. This is because, due to the positioning of the first electrode and the second electrode in the operating fluid tank interior or in a fluid-connected area of the operating fluid tank, the distance from the operating fluid of the first electrode and the second electrode of the capacitor is reduced. Therefore, an electrical field located between the first electrode and the second electrode of the capacitor interacts less with the material of the operating fluid tank and more with the operating fluid located in the operating fluid tank interior. Since the capacitor is in the immediate vicinity of the operating fluid at any operating time and is preferably in direct contact with it, the determined capacity of the capacitor depends only on the fill level. Thus, given a known electrode geometry and a known di-electric conductivity of the operating fluid, the fill level in the operating fluid tank interior can be directly determined from the determined or measured capacity of the capacitor, the fill level of the operating fluid tank or the fill level in a filler tube into the operating fluid tank interior.

The evaluator uses the determined capacity of the capacitor for determining the fill level in the operating fluid tank interior. This is because the higher the fill level in the operating fluid tank interior or in the filler tube is, the more operating fluid is penetrated by the electric field between the first electrode and the second electrode of the capacitor. The capacitor's capacity C is proportional to area A of the electrodes and to the di-electric constant $\varepsilon_r$ of the separation medium, as the operating fluid. Furthermore, the capacity C is inversely proportional to the distance d of the electrodes of the capacitor to each other. The capacity C of the capacitor is calculated according to the following formula: $C=\varepsilon_0*\varepsilon_r*A/d$ A further advantage of the operating fluid tank according to the invention is that it has increased long-term stability.

This is because the plastic material in the first electrode and in the second electrode is not subject to corrosion.

The operating fluid tank is specially designed as an operating fluid tank for a motor vehicle.

The operating fluid tank is designed for receiving and storing an operating fluid.

The first electrode of the capacitor is electrically separated from the second electrode of the capacitor, so that no electrical short circuit between the first electrode and the second electrode is possible.

The first electrode and/or the second electrode preferably have a layer of electrically conductive plastic material.

The first electrode and/or the second electrode are also preferably comprised of electrically conductive plastic material.

The clearance between the first electrode and the second electrode is preferably filled with operating fluid, depending on the fill level within the operating fluid tank interior.

The evaluator is designed as an electronic evaluator. The evaluator is electrically connected to both the first electrode and the second electrode of the capacitor. The electrical connection of the evaluator to the first electrode and the second electrode is preferably realized by means of wires or by means of traces.

The di-electrical conductivity of the operating fluid can also be described as the permittivity of the operating fluid.

The operating fluid tank is preferably designed in such a way that the first electrode and the second electrode of the capacitor are each formed according to a plan. The first electrode and the second electrode are also preferably arranged relating to each other such that side edges of the first electrode and of the second electrode are opposite each other and facing each other.

The operating fluid tank is preferably formed such that the first electrode and/or the second electrode have a plastic material in which electrically conductive particles are dispersed.

The feature according to which the first electrode and/or the second electrode have a plastic material in which electrically conductive particles are dispersed can also be expressed in such a way that the first electrode and/or the second electrode have a plastic material which is filled with electrically conductive particles.

The electrically conductive particles are preferably metal particles, for example in the form of metal powder. The metal can be iron, aluminum, copper, tin, zinc, nickel, silver, gold, platinum or alloys of these metals, such as brass. There are no restrictions on the choice of metal.

The plastic material in which the metal powder is dispersed is preferably high-density polyethylene (HDPE). The plastic material is also preferably polyoxymethylene (POM). The plastic material is also preferably polyamide (PA). The plastic material is also preferably polypropylene (PP). There are no restrictions on the choice of plastic material.

The operating fluid tank is also preferably designed in such a way that the electrically conductive particles contain conductive soot particles.

The operating fluid tank is also preferably designed such that the electrode and/or the second electrode have a high-density polyethylene plastic material in which the electrically conductive particles are dispersed.

A suitably designed operating fluid tank is particularly simple and cost-effective to manufacture. This is because, in an operating fluid tank comprised of plastic material, operating fluid tank preferably has a tank wall, which also comprises high-density polyethylene, so that the electrodes of the capacitor and the tank wall are both produced in an extrusion blow process or in an injection molding process.

The operating fluid tank is also preferably formed in such a way that the first electrode is multi-layered, wherein an electrode layer of the first electrode, which adjoins the clearance of the capacitor, is formed from the electrically conductive plastic material.

The operating fluid tank is also preferably designed such that the first electrode has an outer layer, a recyclate layer adjacent to the outer layer, a first adhesion promoting layer adjacent to the recyclate layer, a barrier layer adjacent to the first adhesion promoting layer, a second adhesion promoting layer and electrode layer adjacent to the barrier layer, wherein the electrode layer is adjacent to the second adhesion promoting layer.

The outer layer is preferably made of high-density polyethylene (HDPE).

The recyclate layer comprises a mixture of the layered materials of the wall of the operating fluid tank.

The first and the second adhesion promoting layers are preferably comprised of low-density polyethylene (LDPE).

The barrier layer preferably comprises ethylene vinyl alcohol (EVOH) copolymer.

The electrode layer is preferably formed as an outer layer and is adjacent to the clearance of the capacitor.

The operating fluid tank is also preferably formed in such a way that the second electrode is multi-layered, wherein an electrode layer of the second electrode, which adjoins the clearance of the capacitor, is formed from the electrically conductive plastic material.

The operating fluid tank is also preferably designed such that the second electrode has an outer layer, a recyclate layer adjacent to the outer layer, a first adhesion promoting layer adjacent to the recyclate layer, a barrier layer adjacent to the first adhesion promoting layer, a second adhesion promoting layer and electrode layer adjacent to the barrier layer, wherein the electrode layer is adjacent to the second adhesion promoting layer.

The outer layer is preferably made of high-density polyethylene (HDPE).

The recyclate layer comprises a mixture of the layered materials of the wall of the operating fluid tank.

The first and the second adhesion promoting layers are preferably comprised of low-density polyethylene (LDPE).

The barrier layer preferably comprises ethylene vinyl alcohol (EVOH) copolymer.

The electrode layer is preferably formed as an outer layer and is adjacent to the clearance of the capacitor.

The operating fluid tank is also preferably designed in such a way that the capacitor connects to a wall of the operating fluid tank.

A suitably designed operating fluid tank is particularly simple and cost-effective to manufacture. This is because the electrodes of the capacitor can be produced together with the tank wall in an extrusion blow process or in an injection molding process. Furthermore, after the manufacturing process of the tank walls, the electrodes can be connected to them in a further process step, in particular by welding.

The tank wall is preferably a side wall of the operating fluid tank. The tank wall is also preferably a base wall of the operating fluid tank. The tank wall is also preferably a top wall of the operating fluid tank.

In the installation position of the operating fluid tank, i.e. when the operating fluid tank is aligned horizontally, the first electrode and the second electrode have vertical elongation components. Preferably, longitudinal elongations of the first electrode and of the second electrode in the installation position of the operating fluid tank are vertical or have at least a vertical extending component.

When connecting the capacitor to the tank wall, the first electrode and the second electrode are connected to the tank wall such that in a connecting area of the first electrode or the second electrode, the first electrode or the second electrode is electrically isolated from the tank wall. For example, an electrically insulating, i.e. electrically non-conductive plastic material is arranged between the first electrode or the second electrode and the tank wall. Such a connection can be made by welding, for example.

The operating fluid tank is also preferably formed in such a way that at least one part of a tank wall of the operating fluid tank forms a first electrode and/or a second electrode.

The tank wall is preferably a side wall of the operating fluid tank. The tank wall is also preferably a base wall of the operating fluid tank. The tank wall is also preferably a top wall of the operating fluid tank.

In the installation position of the operating fluid tank, i.e. when the operating fluid tank is aligned horizontally, the first electrode and the second electrode have vertical elongation components. Preferably, longitudinal elongations of the first electrode and of the second electrode in the installation position of the operating fluid tank are vertical or have at least a vertical extending component.

The operating fluid tank is also preferably designed in such a way that the tank wall is an exterior wall and the first electrode and/or the second electrode face the operating fluid tank interior.

The operating fluid tank is also preferably designed such that the first electrode forms the first partly hollow cylinder and/or the second electrode forms the second partly hollow cylinder.

The operating fluid tank is also preferably designed in such a way that the first partly hollow cylinder is connected to the second electrode via its longitudinal edges to form the clearance, wherein the clearance forms a cavity, wherein the first partly hollow cylinder is connected to the second electrode by means of an electrically insulating plastic material, wherein the electrically insulating plastic material preferably comprises high-density polyethylene (HDPE).

The first electrode preferably forms the first partly hollow cylinder and the second electrode forms the second partly hollow cylinder. In so doing, the first partly hollow cylinder is connected via its longitudinal edges with the longitudinal edges of the second partly hollow cylinder to form the clearance, wherein the clearance forms a cavity, wherein an electrically insulating plastic material is arranged between the longitudinal edges of the first partly hollow cylinder and the second partly hollow cylinder.

The operating fluid tank is also preferably designed in such a way that the operating fluid tank has a reserve which is fluid-connected to the operating fluid tank interior, which is connected to a base of the operating fluid tank, wherein at least one part of a wall of the reserve is designed as the first electrode and/or as the second electrode.

The operating fluid tank is also preferably formed in such a way that the operating fluid tank interior can be filled with operating fluid by means of a filler tube through an opening, wherein the filler tube is constructed as the capacitor, wherein the first electrode is formed as a first partly hollow cylinder and the second electrode as a second partly hollow cylinder. In so doing, the first partly hollow cylinder is connected via its longitudinal edges with the longitudinal edges of the second partly hollow cylinder to form the clearance, wherein the clearance forms a cavity, wherein an electrically insulating plastic material is arranged between the longitudinal edges of the first partly hollow cylinder and the second partly hollow cylinder.

Consequently, the filler tube is formed in such a way that the first partly hollow cylinder, the second partly hollow cylinder and electrically insulating plastic material are made in one piece between the longitudinal edges of the first partly hollow cylinder and the second partly hollow cylinder. An extrusion head for extruding the filler tube is formed accordingly for the manufacture of an appropriate filler tube, so that the filler tube can be directly extruded in one piece from the extrusion head.

Figure 2:
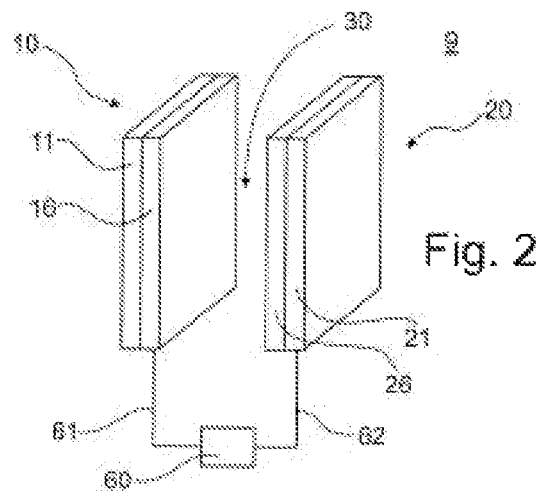
Figure 3:
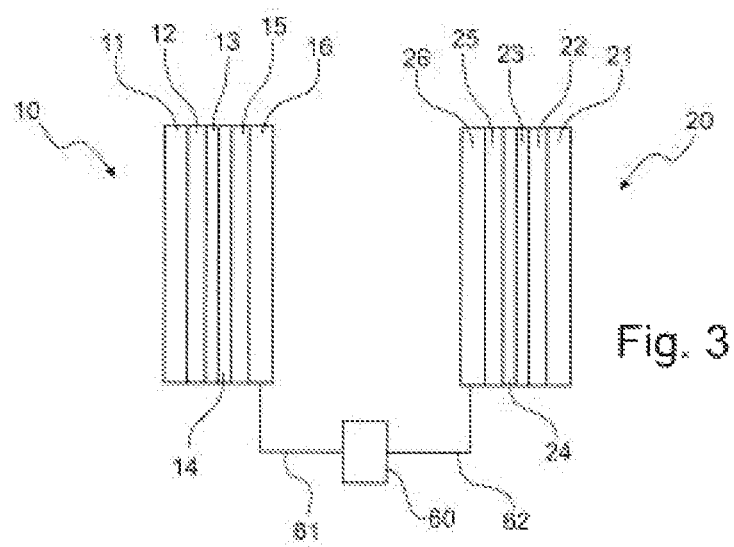
Figure 4:
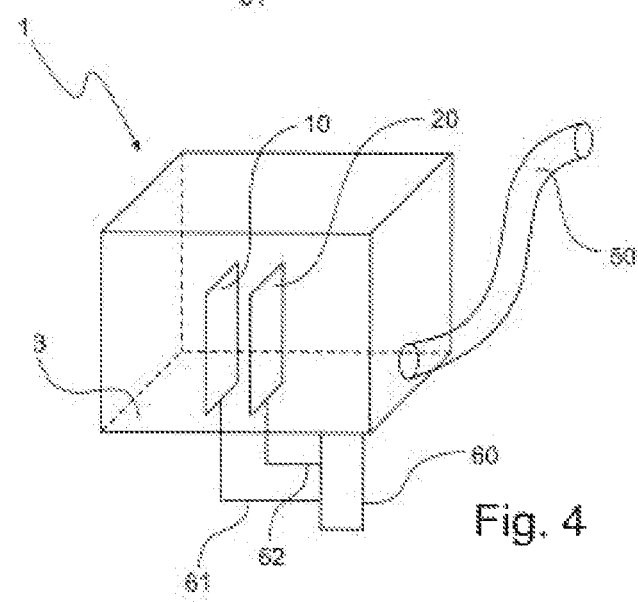
Figure 5:
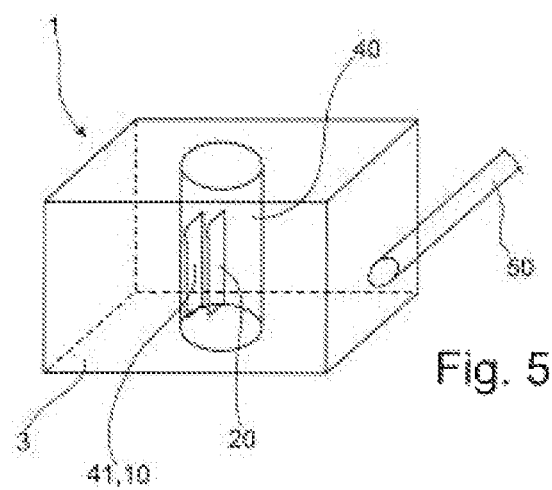
Figure 6:
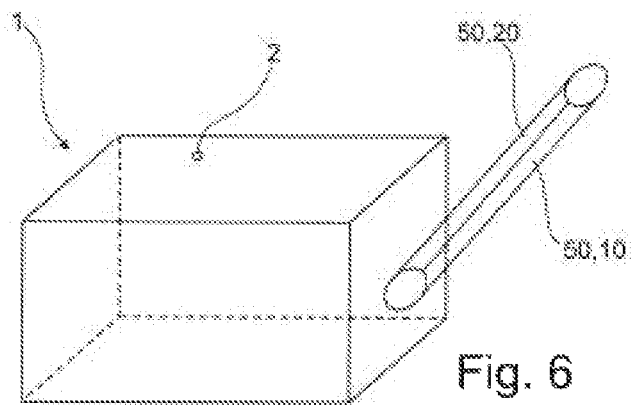
Figure 7:
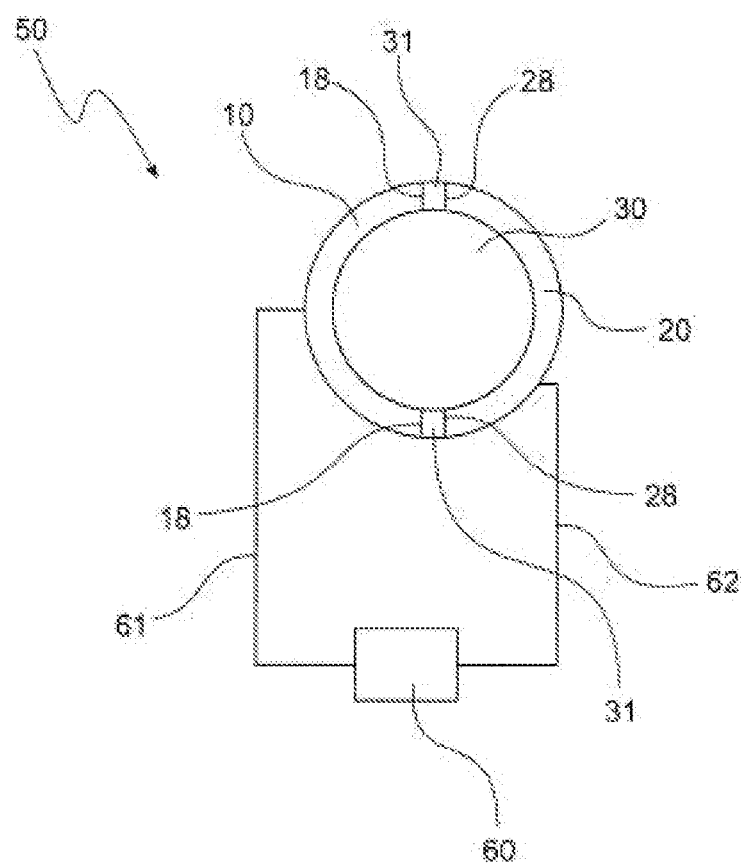

Further advantages, details and features of the invention are shown below in the embodiments. We will show in detail:

FIG. 1: a greatly simplified representation of an operating fluid tank according to the invention according to a first embodiment of the invention;

FIG. 2: a greatly simplified representation of a capacitor with electrodes arranged in two layers;

FIG. 3: a greatly simplified representation of a layer structure of the first electrode and of the second electrode of a capacitor of an operating fluid tank according to a further embodiment of the invention;

FIG. 4: a greatly simplified spatial representation of an operating fluid tank according to the invention according to a further embodiment of the invention;

FIG. 5: a greatly simplified spatial representation of another operating fluid tank according to the invention according to a further embodiment of the invention, in which the capacitor is arranged in a reserve of the operating fluid tank;

FIG. 6: a greatly simplified spatial representation of another operating fluid tank according to the invention according to a further embodiment of the invention, in which the capacitor is part of a filler tube of the operating fluid tank; and FIG. 7: a schematic cross-sectional representation of the filler tube of the operating fluid tank in FIG. 6.

In the following description, the same reference signs denote the same parts or characteristics, so that a reference to a description of a part in one figure also applies to the other figures, in order to avoid repeating descriptions. Furthermore, individual features that have been described in connection with an embodiment are also separately applicable in other embodiments.

FIG. 1 is a spatial representation of a greatly simplified operating fluid tank 1 according to a first embodiment of the invention. The operating fluid tank 1 in the present case is formed as fuel tank 1. However, the invention is not limited such that the operating fluid tank 1 is formed as a fuel tank 1. The operating fluid tank 1 can also be an urea storage tank 1 for the storage of urea to be injected into an exhaust gas system, or a water tank 1 for the storage of water to be injected into combustion chambers of a combustion engine, or a washer water tank 1, or an oil tank 1, or generally as an auxiliary liquid tank 1 or an additive tank 1 for motor vehicles.

An operating fluid tank interior 2 can be filled with operating fluid by means of a tube 50 through an opening. The operating fluid tank interior 2 is delimited by tank walls 3, 4, 5. In the greatly simplified operating fluid tank 1 in FIG. 1, a tank base 3 is connected to a top wall 5 by four side walls 4. However, the operating fluid tank 1 according to the invention is not limited to a correspondingly simple geometric arrangement. For example, the operating fluid tank 1 according to the invention can have a saddle shape with two or more operating fluid tank interiors, which are either fluid-connected to each other or may also be fluid-separated from each other. There are no limitations relating to the geometrical configuration of the operating fluid tank 1 according to the invention.

As can be seen in FIG. 1, the operating fluid tank 1 has a capacitor 9, which in turn has a first electrode 10 and a second electrode 20. A clearance 30 is formed between the first electrode 10 and the second electrode 20 which is fluid-connected to an operating fluid tank interior 2. Both the first electrode 10 and the second electrode 20 are electrically connected via electrical connections 61, 62 to an electronic evaluator 60. More precisely, the first electrode 10 is electrically connected via a first electrical connection 61 or a first connecting wire 61 to the evaluator 60, and the second electrode 20 is electrically connected via a second electrical connection 62 or via a second connecting wire 62 to the evaluator 60. Thus, measurement information or measurement data can be transferred from the electrodes 10, 20 to the evaluator 60.

The operating fluid tank 1 according to the invention is characterized in that the first electrode 10 and the second electrode 20 are made of an electrically conductive plastic material. This means that parts of the first electrode 10 and also parts of the second electrode 20 are made of an electrically conductive plastic material. The electrical conductivity in the first electrode 10 and the second electrode 20 are made of a high-density polyethylene plastic material in which the electrically conductive particles are dispersed. Consequently, the plastic material of the first electrode 10 and of the second electrode 20 is filled with conductive particles.

The conductive particles, for example, may be metal powders. The metal can, in particular, be iron, aluminum, copper, tin, zinc, nickel, silver, gold, platinum or alloys of these metals, such as brass. There are no limitations on the choice of metal according to the invention.

Another way to make the plastic material of the first electrode 10 and the second electrode 20 in such a way as to be electrically conductive is by dispersing conductive soot particles in the plastic material.

The plastic material in the first electrode 10 and the second electrode 20, for example, may be high-density polyethylene. Furthermore, it is also possible for the plastic material to be polyoxymethylene. Another plastic material suitable for use as the first electrode 10 and second electrode 20 is polyamide. Regarding the selection of the plastic material for the first electrode 10 and the second electrode 20, there are no limitations according to the invention.

It can be seen in FIG. 1 that a part of the side wall 5 in FIG. 1 on the left forms the first electrode 10. The second electrode 20 is connected to the tank base 3. Here, the connection between the second electrode 20 and the tank base 3 is such that the second electrode 20 is electrically separated from the tank base 3, so that a charge can only be transported from the second electrode 20 via the second electrical connection 62. The same applies to the first electrode 10. The first electrode 10 is electrically separated in its edge area from the rest of side wall 5, so that an electrical charge can only be transported from the first electrode 10 via the first electrical connection 61.

FIG. 2 is a greatly simplified capacitor 9 without the associated operating fluid tank 1. In FIG. 2, both the first electrode 10 and the second electrode 20 in the capacitor 9 are multi-layered. The first electrode 10 has an electrode layer 16 and an outer layer 11. The first electrode layer 16 is as described above formed from a plastic material in which conductive particles are dispersed. The outer layer 11 comprises an electrically non-conductive plastic material, such as high-density polyethylene or polyamide. The second electrode 20 also has an electrode layer 26 and an outer layer 21. The second electrode layer 26 is also formed from a plastic material in which conductive particles are dispersed. The outer layer 21 comprises an electrically non-conductive plastic material, such as high-density polyethylene or polyamide. The first electrode layer 16 and the second electrode layer 26 delimit the clearance 30 of the capacitor 9. It can also be seen in FIG. 2 that the first electrode layer 16 is connected to the evaluator 60 via the first electrical connection 61 with the evaluator 60 and the second electrode layer 26 is connected via the second electrical connection 62.

In FIG. 3, a first electrode 10 and a second electrode 20 of a capacitor 9 are electrically connected with the evaluator 60. The rest of the operating fluid tank 1 is not depicted in FIG. 3. It can be seen that the first electrode 10 has an outer layer 11, a recyclate layer 12 adjacent to the outer layer 11, a first adhesion promoting layer 13 adjacent to the recyclate layer 12, a barrier layer 14 adjacent to the first adhesion promoting layer 13, a second adhesion promoting layer 15 and the electrode layer 16 adjacent to the barrier layer 14. Thus, the electrode layer 16 is adjacent to the second adhesion promoting layer 15. The layer structure of the first electrode 10 in FIG. 3 corresponds to the layer structure of a tank wall for a fuel tank. Thus, it can be seen that the first electrode 10 can be formed as part of a tank wall 3, 4, 5.

It can also be seen in FIG. 3 that the second electrode 20 has an outer layer 21, a recyclate layer 22 adjacent to the outer layer 21, a first adhesion promoting layer 23 adjacent to the recyclate layer 22, a barrier layer 24 adjacent to the first adhesion promoting layer 23, a second adhesion promoting layer 25 and the electrode layer 26 adjacent to the barrier layer 24. Thus, the electrode layer 26 is adjacent to the second adhesion promoting layer 25. The layer structure of the second electrode 20 in FIG. 3 corresponds to the layer structure of a tank wall for a fuel tank. Thus, it can be seen that the first electrode 20 can be formed as part of a tank wall 3, 4, 5.

Furthermore, it is apparent in FIG. 3 that the electrode layer 16 of the first electrode 10 is arranged facing the electrode layer 26 of the second electrode 20.

FIG. 4 shows an operating fluid tank 1 according to a further embodiment. The operating fluid tank 1 in FIG. 4 differs from the operating fluid tank in FIG. 1 in that the first electrode 10 is not formed as part of the side wall 5. It can be seen that both the first electrode 10 and the second electrode 20 are connected to the tank base 3. The rest of the structure of the operating fluid tank 1 in FIG. 4 is identical to the structure of the operating fluid tank in FIG. 1.

FIG. 5 shows an operating fluid tank 1 according to a further embodiment of the invention. The operating fluid tank 1 in FIG. 5 has a reserve 40 within which, for example, a feed pump not shown in FIG. 5 may be arranged for conveying the operating fluid. It can be seen that at least one part of a wall 41 of the reserve 40 forms the first electrode 10. The second electrode 20 is arranged within the reserve 40 and connected to the tank base 3 in the illustrated embodiment. In addition, the reserve 41 is connected to the tank base 3 of the operating fluid tank 1.

Although not depicted in FIG. 5, the entire wall 41 of the reserve 40 can be formed as a capacitor. For this purpose, both the first electrode 10 and the second electrode 20 are each formed as partly hollow cylinder 10, 20, wherein longitudinal edges of the partly hollow cylinder 10, 20 are not in electrical contact with each other, such that the first electrode 10 is electrically separated from the second electrode 20.

FIG. 6 shows an operating fluid tank 1 according to a further embodiment of the invention. In the operating fluid tank 1 in FIG. 6 is the filler tube 50 which forms a capacitor 9, wherein the first electrode 10 forms a first partly hollow cylinder 10 and the second electrode 20) forms a second partly hollow cylinder 20.

FIG. 7 shows a section view of the filler tube 50 of the operating fluid tank 1 in FIG. 6. It can be seen that the first partly hollow cylinder 10 is connected by its longitudinal edges 18 to the longitudinal edges 28 of the second partly hollow cylinder 20 to form the clearance 30. The clearance 30 forms a cavity 30. In FIG. 7, it can be seen that an electrically insulating plastic material 31 is arranged between the longitudinal edges 18 of the first partly hollow cylinder 10 and the longitudinal edges 28 of the second partly hollow cylinder 20, such that the first electrode 10 is electrically separated from the second electrode 20.

Although not shown in FIG. 6, several capacitors 9 may be arranged in the filler tube 6 along the longitudinal extension direction of the filler tube 50.

LIST OF REFERENCE NUMERALS

1 Operating fluid tank
2 Operating fluid tank interior
3 Base wall/tank wall (of the operating fluid tank)
4 Top wall/tank wall (of the operating fluid tank)
5 Side wall/tank wall (of the operating fluid tank)
9 Capacitor
10 First electrode/first partly hollow cylinder (of the capacitor)
11 Outer layer (of the first electrode)
12 Recyclate layer (of the first electrode)
13 First adhesion promoting layer (of the first electrode)
14 Barrier layer (of the first electrode)
15 Second adhesion promoting layer (of the first electrode)
16 Electrode layer (of the first electrode)
18 Longitudinal edge (of the first partly hollow cylinder)
20 Second electrode/second partly hollow cylinder (of the capacitor)
21 Outer layer (of the second electrode)
22 Recyclate layer (of the second electrode)
23 First adhesion promoting layer (of the second electrode)
24 Barrier layer (of the second electrode)
25 second adhesion promoting layer (of the second electrode)
26 Electrode layer (of the first electrode)
28 Longitudinal edge (of the first partly hollow cylinder)
30 Clearance/cavity (of the capacitor)
31 Electrically insulating plastic material
40 Reserve
41 Wall (of the reserve)
50 Filler tube
60 Evaluator
61 First electrical connection/first connecting wire
62 Second electrical connection/second connecting wire

The invention claimed is:

1. An operating fluid tank with a capacitive determination of a fill level of the operating fluid tank, the operating fluid tank comprising:
 a capacitor comprising a first electrode and a second electrode, wherein between the first electrode and the second electrode a clearance is formed which is fluid-connected to an operating fluid tank interior; and
 an evaluator electrically connected to the capacitor for determining a capacitance of the capacitor by means of measurement signals determined by the capacitor, wherein the capacitance of the capacitor indicates a measure of the fill level,
 wherein the first electrode and the second electrode comprise an electrically conductive plastic material,
 wherein:
  the first electrode is multi-layered, and
  an electrode layer of the first electrode, which adjoins a clearance of the capacitor, is formed from the electrically conductive plastic material, and
 wherein the first electrode has an outer layer, a recyclate layer adjacent to the outer layer, a first adhesion promoting layer adjacent to the recyclate layer, a barrier layer adjacent to the first adhesion promoting layer, a second adhesion promoting layer, and an electrode layer adjacent to the barrier layer, and
 wherein the electrode layer is adjacent to the second adhesion promoting layer.

2. The operating fluid tank according to claim 1, wherein the capacitor is connected to a tank wall of the operating fluid tank.

3. The operating fluid tank according to claim 1, wherein:
 the operating fluid tank has a reserve fluid-connected connected to the operating fluid tank interior which is connected to a tank base wall of the operating fluid tank; and
 at least one part of a wall of the reserve forms a first electrode and/or a second electrode.

4. The operating fluid tank according to claim 1, wherein:
 the operating fluid tank interior is filled with operating fluid via a filler tube through an opening;
 the filler tube forms the capacitor, wherein the first electrode forms a first partly hollow cylinder and the second electrode forms a second partly hollow cylinder;
 the first partly hollow cylinder is connected through longitudinal edges thereof with longitudinal edges of the second partly hollow cylinder to form a clearance, wherein the clearance forms a cavity; and
 an electrically insulating plastic material is arranged between the longitudinal edges of the first partly hollow cylinder and the longitudinal edges of the second partly hollow cylinder.

5. The operating fluid tank according to claim 1, wherein the capacitor is arranged in a liquid separator of a venting device of the operating fluid tank via which the operating fluid tank interior is at least indirectly fluid-connected to the atmosphere, so that an operating fluid in the liquid separator is detectable via the capacitor.

6. The operating fluid tank according to claim 1, wherein the electrically conductive plastic material includes electrically conductive particles dispersed therein.

7. The operating fluid tank according to claim 6, wherein the electrically conductive particles comprise conductive soot particles.

8. The operating fluid tank according to claim 6, wherein the first electrode and/or the second electrode comprise a high-density polyethylene plastic material in which the electrically conductive particles are dispersed.

9. The operating fluid tank according to claim 1, wherein:
 the second electrode is multi-layered; and
 an electrode layer of the second electrode, which adjoins a clearance of the capacitor, is formed from electrically conductive plastic material.

10. The operating fluid tank according to claim 9, wherein the second electrode has an outer layer, a recyclate layer adjacent to the outer layer, a first adhesion promoting layer adjacent to the recyclate layer, a barrier layer adjacent to the first adhesion promoting layer, a second adhesion promoting layer, and an electrode layer adjacent to the barrier layer, and
wherein the electrode layer is adjacent to the second adhesion promoting layer.

11. The operating fluid tank according to claim 1, wherein at least one part of a tank wall of the operating fluid tank forms the first electrode and/or as the second electrode.

12. The operating fluid tank according to claim 11, wherein the tank wall is an exterior wall and the first electrode and/or the second electrode face the operating fluid tank interior.

13. The operating fluid tank according to claim 1, wherein the first electrode forms a first partly hollow cylinder and/or the second electrode forms a second partly hollow cylinder.

14. The operating fluid tank according to claim 12, wherein:
the first partly hollow cylinder is connected via longitudinal edges thereof to the second electrode to form a clearance, wherein the clearance forms a cavity; and
the first partly hollow cylinder is connected to the second electrode by means of an electrically insulating plastic material.

\* \* \* \* \*